United States Patent
Twist

(10) Patent No.: US 8,555,932 B2
(45) Date of Patent: Oct. 15, 2013

(54) CORRUGATED METAL PIPE

(75) Inventor: Jordan Twist, Newport Beach, CA (US)

(73) Assignee: W.E. Hall Company, Inc., Newport Beach, CA (US)

( * ) Notice: Subject to any disclaimer, the term of this patent is extended or adjusted under 35 U.S.C. 154(b) by 0 days.

(21) Appl. No.: 13/325,848

(22) Filed: Dec. 14, 2011

(65) Prior Publication Data

US 2013/0153078 A1    Jun. 20, 2013

(51) Int. Cl.
*F16L 11/16*    (2006.01)

(52) U.S. Cl.
USPC ............ 138/135; 138/134; 138/122; 138/154

(58) Field of Classification Search
USPC ......... 138/154, 122, 121, 129, 134, 135, 173; 72/49; 405/127
See application file for complete search history.

(56) References Cited

U.S. PATENT DOCUMENTS

| 127,438 A | 6/1872 | Stephens |
|---|---|---|
| 192,079 A | 6/1877 | Noble |
| 848,238 A | 3/1907 | Greenfield |
| 887,084 A | 5/1908 | Fulton |
| 901,534 A | 10/1908 | Hamlin |
| 907,136 A | 12/1908 | Farrington et al. |
| 925,317 A | 6/1909 | Eldred |
| 1,049,544 A | 1/1913 | Smith |
| 1,263,340 A | 4/1918 | Silk |
| 1,270,579 A | 6/1918 | Witzenmann |
| 1,340,818 A | 5/1920 | Brinkman |
| 1,453,220 A | 4/1923 | Witzenmann |
| 1,570,886 A | 1/1926 | Fulton et al. |
| 1,644,823 A | 10/1927 | Fay |
| 1,677,523 A | 7/1928 | Herbst et al. |
| 1,718,468 A | 6/1929 | Leary |
| 1,761,034 A | 6/1930 | Gillett |
| 1,806,920 A | 5/1931 | See |
| 1,885,587 A | 11/1932 | Burton |
| 2,022,694 A | 12/1935 | Stone |
| 2,068,022 A | 1/1937 | Hammel |
| 2,094,691 A | 10/1937 | Williams |
| 2,118,060 A | 5/1938 | Stone |
| 2,135,447 A | 8/1938 | Jacobson |
| 2,180,091 A | 11/1939 | Norton et al. |
| 2,330,966 A | 10/1943 | Gottwald et al. |
| 2,686,747 A | 8/1954 | Wurtz et al. |
| 2,713,381 A | 7/1955 | Seek |
| 2,739,089 A | 3/1956 | Hageltorn |
| 2,758,366 A | 8/1956 | Voetelink |
| 2,841,183 A | 7/1958 | Rejeski |
| 2,859,061 A | 11/1958 | Reid |
| 2,898,634 A | 8/1959 | Alderfer |

(Continued)

*Primary Examiner* — Patrick F Brinson
(74) *Attorney, Agent, or Firm* — Stetina Brunda Garred & Brucker

(57) ABSTRACT

A metal pipe of single piece construction including a wall formed of a single corrugated metal sheet. The sheet has opposing first and second edges extending longitudinally along the sheet. The wall includes a seam that is formed by abutting portions of the first and second edges. The seam extends helically about and along a length of the wall. The sheet has an interior wall side and an opposing exterior wall side. The interior wall side defines an interior wall surface of the wall. The exterior wall side defines an exterior wall surface of the wall. The sheet has a sinusoidal cross-sectional profile defining 3 corrugation peaks at the interior wall surface and 3 corrugation peaks at the exterior wall surface. The sheet has a flattened sheet width of approximately 27 inches and a finished sheet width of approximately 21 inches. The wall defines a pipe diameter of at least 96 inches.

11 Claims, 3 Drawing Sheets

(56) References Cited

U.S. PATENT DOCUMENTS

| | | |
|---|---|---|
| 2,915,110 A | 12/1959 | Ferguson et al. |
| 3,085,596 A | 4/1963 | Rejeski |
| 3,126,306 A | 3/1964 | Sherman |
| 3,199,541 A | 8/1965 | Richitelli |
| 3,219,368 A | 11/1965 | Crumpler |
| 3,224,814 A | 12/1965 | Fisher |
| 3,240,177 A | 3/1966 | Habdas |
| 3,247,692 A | 4/1966 | Davis |
| 3,255,516 A | 6/1966 | Sommer |
| 3,263,321 A | 8/1966 | Lombardi |
| 3,273,600 A | 9/1966 | Swan |
| 3,286,341 A | 11/1966 | Miller |
| 3,330,303 A | 7/1967 | Fochler |
| 3,331,400 A | 7/1967 | Vilkaitis |
| 3,402,086 A | 9/1968 | Smith et al. |
| 3,422,856 A | 1/1969 | Hunter et al. |
| 3,435,852 A | 4/1969 | Trihey |
| 3,442,297 A | 5/1969 | Wesesku |
| 3,455,584 A | 7/1969 | Henrickson |
| 3,474,514 A | 10/1969 | Lombardi |
| 3,478,770 A | 11/1969 | Osborn et al. |
| 3,491,825 A | 1/1970 | Peterson et al. |
| 3,550,639 A | 12/1970 | Okuda |
| 3,572,394 A | 3/1971 | Davis |
| 3,621,884 A | 11/1971 | Trihey |
| 3,637,224 A | 1/1972 | Triplett et al. |
| 3,656,514 A | 4/1972 | Kafka |
| 3,721,597 A | 3/1973 | Colburn |
| 3,722,075 A | 3/1973 | Fay |
| 3,731,711 A | 5/1973 | Bauer |
| 2,417,676 A | 3/1974 | Chernack |
| 3,809,223 A | 5/1974 | Kendall |
| 3,834,009 A | 9/1974 | Iida et al. |
| 3,857,159 A | 12/1974 | Davis |
| 3,865,146 A | 2/1975 | Meserole |
| 3,868,433 A | 2/1975 | Bartz et al. |
| 3,872,893 A | 3/1975 | Roberts |
| 3,877,136 A | 4/1975 | Groch et al. |
| 4,029,129 A | 6/1977 | Harper |
| 4,121,624 A | 10/1978 | Chen |
| 4,129,152 A | 12/1978 | Davis |
| 4,161,194 A | 7/1979 | Nyssen |
| 4,161,811 A | 7/1979 | Nyssen |
| 4,167,645 A | 9/1979 | Carey |
| 4,304,266 A | 12/1981 | Kutnyak et al. |
| 4,312,902 A | 1/1982 | Murase et al. |
| 4,326,561 A | 4/1982 | Kutnyak |
| 4,333,221 A | 6/1982 | Hayashi |
| 4,337,800 A | 7/1982 | Carlson et al. |
| 4,355,448 A | 10/1982 | Ezaki |
| 4,360,227 A | 11/1982 | Bridges |
| 4,383,555 A | 5/1983 | Finley |
| 4,420,019 A | 12/1983 | Dillon |
| 4,443,019 A | 4/1984 | Ishido et al. |
| 4,472,475 A | 9/1984 | Decroix |
| 4,486,484 A | 12/1984 | Schafer |
| 4,509,560 A | 4/1985 | Schafer |
| 4,575,400 A | 3/1986 | Ueda et al. |
| 4,606,953 A | 8/1986 | Suzuki et al. |
| 4,630,650 A | 12/1986 | Davis |
| 4,689,174 A | 8/1987 | Lupke |
| 4,715,609 A | 12/1987 | Mino et al. |
| 4,763,830 A | 8/1988 | Davis |
| 4,790,686 A | 12/1988 | Christ et al. |
| 4,791,800 A | 12/1988 | Alexander |
| 4,830,898 A | 5/1989 | Smith |
| 4,838,317 A | 6/1989 | Andre et al. |
| 4,852,616 A | 8/1989 | Holcomb |
| 4,865,210 A | 9/1989 | Brainard, II |
| 4,926,909 A | 5/1990 | Salinas |
| 4,964,440 A | 10/1990 | Andre et al. |
| 5,046,531 A | 9/1991 | Kanao |
| 5,074,138 A | 12/1991 | Miller |
| 5,158,115 A | 10/1992 | Miller |
| 5,300,336 A | 4/1994 | Wong et al. |
| 5,316,606 A | 5/1994 | Andre |
| 5,356,679 A | 10/1994 | Houis et al. |
| 5,411,619 A | 5/1995 | Sundqvist et al. |
| 5,429,397 A | 7/1995 | Kanao |
| 5,454,402 A | 10/1995 | Andre et al. |
| 5,480,505 A | 1/1996 | Andre |
| 5,980,670 A | 11/1999 | Andre |
| 6,009,912 A | 1/2000 | Andre |

CORRUGATED METAL PIPE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates in general to pipes, and more particularly, to corrugated metal pipes.

Corrugated metal pipe is used extensively in flood control, drainage and sewer systems because of its economic value, strength and durability. The pipe is usually fabricated in 20 foot and 24 foot sections; however sections in other lengths are available. Widely used pipe diameters may range from 6 to as much as 300 inches and typical wall thicknesses are 0.052 inches (18 gauge), 0.064 inches (16 gauge), 0.079 inches (14 gauge), 0.109 inches (12 gauge), 0.138 inches (10 gauge) and 0.168 inches (8 gauge).

Corrugated metal pipe derives most of its inherent strength from the corrugations formed into the metal sheets or plates at the time of fabrication. Helical corrugated pipe is a common type of corrugated pipe with helical corrugations, fabricated from corrugated metal sheet, with a continuous helical seam. Corrugated metal sheet is a mill product in sheet or coil form for fabricating helical corrugated pipe products. Corrugations commonly used for metal pipes are circular arcs connected by tangents, and are described by pitch and depth. Pitch is measured at right angles to the corrugations from crest (peak) to crest (peak) on a same side of a pipe sheet. Depth of a corrugation is measured from a crest of a corrugation to the lowest portion of an adjoining valley, both measured on a same side of a pipe sheet. A corrugation is named using its pitch and depth as "pitch by depth."

A standard "3×1" helical corrugation profile features a 3 inch pitch and a 1 inch depth. Seven (7) corrugations are included on each side of the metal sheet. The corrugated metal sheet is formed from a flattened sheet width is about 27 inches (specifically 27¼ inches). The finished (corrugated) sheet width is 21" (+−½ inch) with a lock seam. A standard "5×1" helical corrugation profile features a 5 inch pitch and a 1 inch depth. Six (6) corrugations are included on each side of the metal sheet. The corrugated metal sheet is formed from a flattened sheet width is about 34 inches (specifically 33⁵⁄₁₆ inches). The finished (corrugated) sheet width is 30" (+−½ inch) with a lock seam. For large pipe diameters (over 48 inches), a 3×1 corrugation profile is the established industry profile. Traditional helical corrugated steel pipe (CSP) is limited to 144 inches in diameter to still meet the ASTM A796 Structural guidelines for horizontal deployment.

Due to the structural limitations of typical helical corrugated pipe, for larger diameter vertical and horizontal pipes (such as 168-300 inches) corrugated sectional steel plate is used. These larger corrugated metal pipes are typically used for vertical applications as caissons and foundations for shafts, and for horizontal pipe applications (such as in flood control, drainage and sewer systems). In this regard, a helical configuration is not used. Rather, individual sections of rectangular steel plate (of 120 inches by 72 inches) are each formed to have lengthwise corrugations and the metal plates are curved into widthwise arc segments. Multiple sections of metal plate are joined together to form sections of pipe. The periphery of the plate sections are punched to facilitate the plates being joined together. Typically, the steel plates are formed at a manufacturing plant and then shipped to the installation worksite. At the worksite, the curved sectional metal plates are delivered and then must be maneuvered to be assembled to form a pipe. This assembly process is a difficult process as the curved metal plates are cumbersome to maneuver by nature.

Accordingly, there exists a need in the art for an improved corrugated pipe arrangement in comparison to the prior art.

BRIEF SUMMARY

According to an aspect of the present invention, there is provided a metal pipe of single piece construction including a wall formed of a single corrugated metal sheet. The sheet has opposing first and second edges extending longitudinally along the sheet. The wall includes a seam that is formed by abutting portions of the first and second edges. The seam extends helically about and along a length of the wall. The sheet has an interior wall side and an opposing exterior wall side. The interior wall side defines an interior wall surface of the wall. The exterior wall side defines an exterior wall surface of the wall. The sheet has a sinusoidal cross-sectional profile defining 3 corrugation peaks at the interior wall surface and 3 corrugation peaks at the exterior wall surface. The sheet has a flattened sheet width of approximately 27 inches and a finished sheet width of approximately 21 inches. The wall defines a pipe diameter of at least 96 inches.

According to various embodiments, the finished sheet width may be between 20¼ inches and 22⅛ inches. The seam may be a lock seam. The sheet may have a corrugation pitch of approximately 7 inches. The sheet may have a corrugation pitch between 6¾ inches and 7⅜ inches. The sheet may have a corrugation depth between adjacent corrugations of approximately 2 inches. The wall may define a pipe diameter between 96 inches and 288 inches. The wall may be cylindrical shaped. The metal sheet may have a thickness between 18 gauge and 8 gauge.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of the invention, and is not intended to represent the only form in which the present invention may be constructed or utilized. Reference throughout the detailed description to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this detailed description are not necessarily all referring to the same embodiment. The following description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described to avoid obscuring aspects of the invention. It is further understood that the use of relational terms such as first and second, and the like are used solely to distinguish one from another entity without necessarily requiring or implying any actual such relationship or order between such entities.

Figure 1:
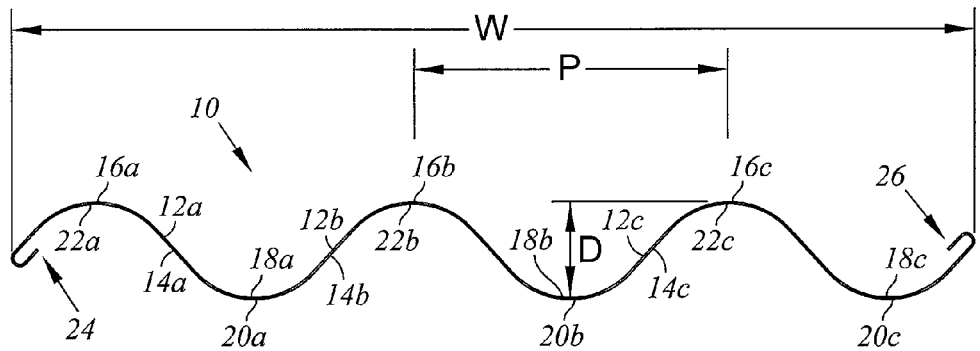
FIG. 1 is a cross sectional view of a corrugated metal sheet utilized in the fabrication of corrugated metal pipe according to an aspect of the invention.

Referring now to FIG. 1 there is depicted a cross sectional view of a corrugated metal sheet 10 utilized in the fabrication of corrugated metal pipe according to an aspect of the invention. The metal sheet 10 includes three (3) corrugations 12a-c on one side and three (3) corrugations 14a-c on an opposing side. Each of the corrugations 12a-c respectively includes corrugation peaks 16a-c. Adjacent to each of the corrugations 12a-c respectively are corrugation valleys 18a-c. Each of the corrugations 12a-c respectively includes corrugation peaks 20a-c. Adjacent to each of the corrugations 14a-c respectively are corrugation valleys 22a-c.

The metal sheet 10 has first and second edges 24, 26. In the embodiment depicted, each of the first and second edges 24, 26 are bent back upon themselves in a lock seam configuration. The corrugation profile of the metal sheet 10 is characterized by a pitch (P) and a depth (D). The corrugated metal sheet 10 has a finished (corrugated) sheet width (W) of approximately 21 inches with a lock seam.

Figure 2:
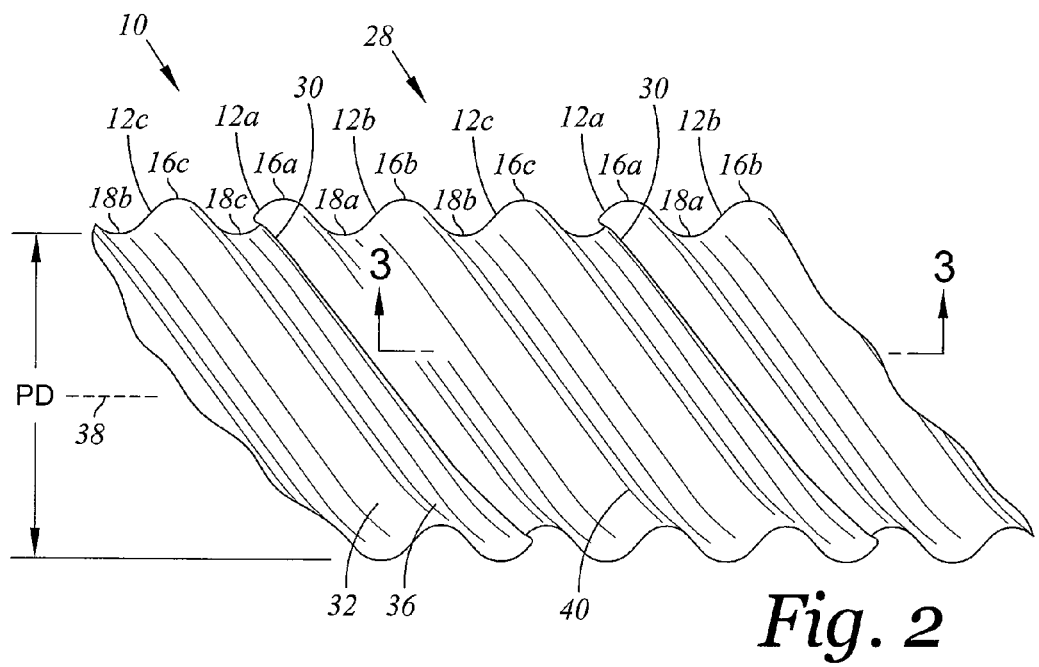
FIG. 2 is a side view of a corrugated metal pipe in accordance with an aspect of the invention.
Figure 3:
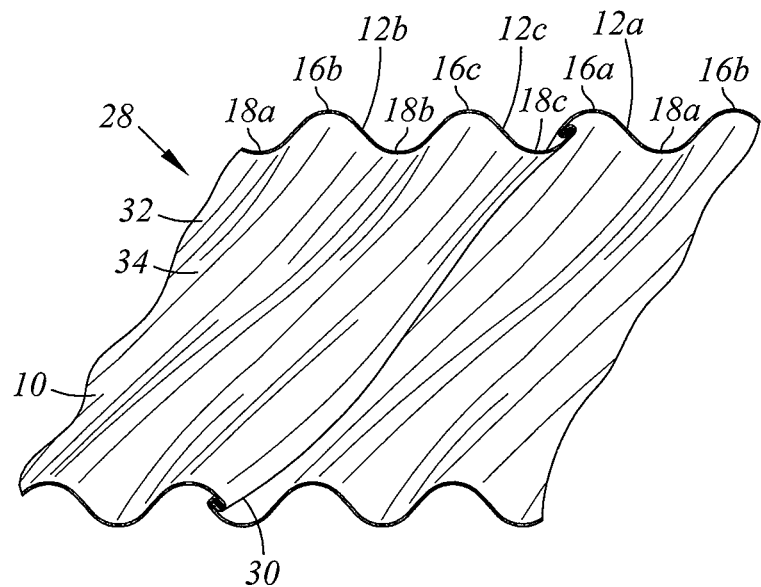
FIG. 3 is a cross sectional view as viewed from the axis 3-3 of FIG. 2.
Figure 4:
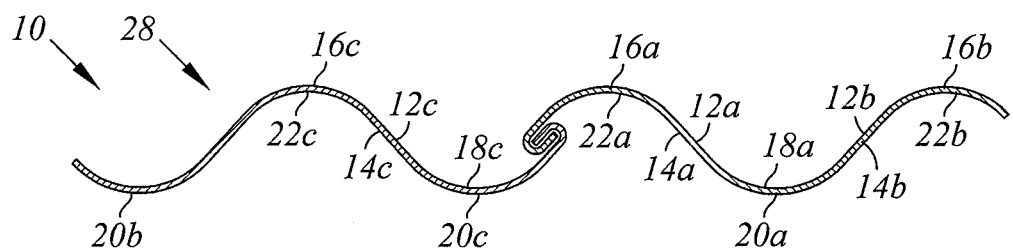
FIG. 4 is an enlarged cross sectional view of a portion of a length of corrugated metal pipe constructed in accordance with an aspect of the present invention.
Figure 5:
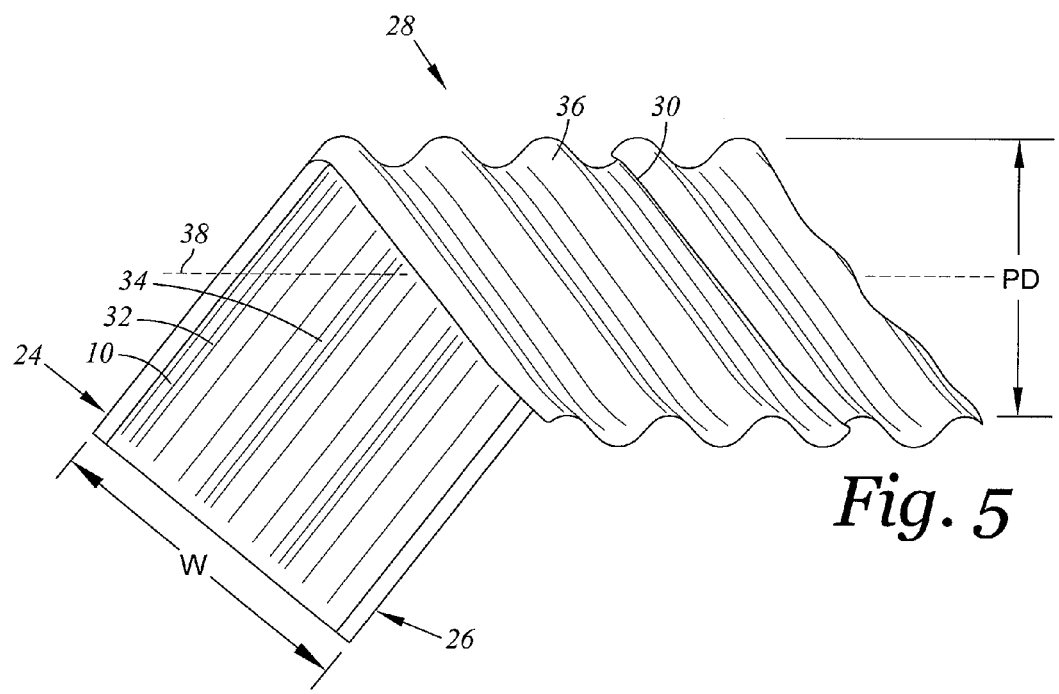
FIG. 5 illustrates a section of corrugated metal pipe during fabrication from the corrugated metal sheet.

Referring now to FIG. 2 there is depicted a side view of a corrugated metal pipe 28 in accordance with an aspect of the invention. FIG. 3 is a cross sectional view as viewed from the axis 3-3 of FIG. 3. FIG. 4 is an enlarged cross sectional view of a portion of a length of the corrugated metal pipe 64 constructed in accordance with an aspect of the present invention. FIG. 5 illustrates a section of the corrugated metal pipe 28 during fabrication from the corrugated metal sheet 10. As is illustrated, the metal sheet 10 may be "feed" towards the forming metal pipe 28.

According to an aspect of the invention, there is provided a metal pipe 10 of single piece construction including the wall 32 formed of the single corrugated metal sheet 10. The sheet 10 has the opposing first and second edges 24, 26 extending longitudinally along the sheet. The wall includes a seam, such as lock seam 30, that is formed by abutting portions of the first and second edges 24, 26. The seam 30 extends helically about and along a length of the wall 32. The sheet 10 has an interior wall side 34 and an opposing exterior wall side 36. The interior wall side 34 defines an interior wall surface 38 of the wall 32. The exterior wall side 36 defines an exterior wall surface 40 of the wall 32. The sheet 10 has a sinusoidal cross-sectional profile defining 3 corrugation peaks 20a-c at the interior wall surface 38 and 3 corrugation peaks 16a-c at the exterior wall surface 40. The sheet 10 has a flattened sheet width of approximately 27 inches and a finished sheet width of approximately 21 inches. The wall defines a pipe diameter of at least 96 inches.

As mentioned above, the corrugated metal 10 sheet has a flattened sheet width of approximately 27 inches. As used herein approximately 27 inches refers to 27 inches +− manufacturing tolerances or specifications. In this regard, a ½ inch tolerance would result in approximately 27 inches being used herein to mean be between 26½ inches and 27½ inches. The corrugated metal 10 sheet has a finished sheet width of approximately 21 inches. As used herein approximately 21 inches refers to 21 inches +− manufacturing tolerances or specifications. In this regard, a ¾ inch lower tolerance and a 1⅛ inch upper tolerance would result in approximately 21 inches being used herein to mean between 20¼ inches and 22⅛ inches.

According to various embodiments, the metal sheet 10 may have a corrugation pitch (P) of approximately 7 inches. The metal sheet 10 may have a corrugation depth (D) between adjacent corrugations of approximately 2 inches. In this regard, in this embodiment, the corrugation profile would be referred to as "7×2". As used herein approximately 7 inches refers to 7 inches +− manufacturing tolerances or specifications. In this regard, a ¼ inch lower tolerance and a ⅛ inch upper tolerance would result in approximately 21 inches being used herein to mean between 6¾ inches and 7⅛ inches. The pitch would be impacted based upon the specification for the desired flatten and finished sheet widths and corrugation depth (D).

The wall 32 is defined by a longitudinal axis 42. The wall 32 defines a pipe diameter (PD) with reference to the longitudinal axis 42. The pipe diameter (PD) may be between 96 inches and 288 inches. In the embodiment illustrated, the metal pipe 28 is cylindrical shaped. The metal sheet 10 may have a thickness between 18 gauge and 8 gauge. The metal utilized to fabricate the metal sheet 10 may be chosen from any of those which are well known to one of ordinary skill in the art, such as steel. Further, the metal sheet 10 may be surface coated as may be desired.

The particular manufacturing processes for forming the metal sheet 10 with the corrugation profile may be chosen from any of those processes which are well known to one of ordinary skill in the art. Moreover, the particular manufacturing processes for forming the metal pipe 28 from the metal sheet 10 may be chosen from any of those processes which are well known to one of ordinary skill in the art. While the seam 30 is depicted as a lock seam, it is contemplated that other attachment or bonding arrangements, such as welding may be utilized, may be selected from those which are well known to one of ordinary skill in the art.

It is contemplated that the structural strength of the metal pipe 28 having corrugation pitch of approximately 7 inches and a finished sheet width of approximately 21 inches approximates that of a metal pipe formed of corrugated multi-sectional plate (with curved rectangular plates of 120 by 72 inches) of comparable gauge. As such, the use of multiple curved sectional steel plates to form corrugated pipe may be avoided in favor of the helical corrugated metal pipe 28 of the present invention.

Significantly, it is contemplated that helical corrugated metal pipe fabrication equipment may be truck mounted and thus be considered mobile in nature. As such, helical corrugated metal pipe fabrication equipment may be utilized to form the metal pipe 28 at a worksite location. Metal sheeting may be provided as raw goods in the form of a continuous roll.

In contrast, the fabrication equipment used to produce metal plate sections for corrugated metal pipe is not considered mobile. The process for forming the curvature of the metal plates and corrugations for pipe applications is one which requires heavy fabrication equipment. Other manufacturing equipment is used for the punching processes used to punch holes in the periphery of the metal plates. Such equipment by nature is not mobile and therefore would be only located and used in a fabrication plant. In this regard, use of metal plates for corrugated metal pipe applications requires shipment of formed metal plates (widthwise curved in to an arc segment, lengthwise corrugated, and perimeter punched) to the worksite from the plate fabricator. Thus, use of metal sheets to form corrugated metal pipe at a worksite location avoids inefficiencies of shipment of curved metal plates in terms of cost, time and logistics. An additional benefit of helical corrugated pipe fabrication used at a work site is that the cumbersome process of joining multiple curved metal plates to form a metal pipe is avoided. Furthermore, use of the worksite fabricated helical corrugated metal pipe for large diameters (over 144 inches) is also comparatively beneficial in that a corrugated pipe fabricator can stock just metal sheets with sheet widths of approximately 27 inch and still be able to produce corrugated metal pipe in a full range of diameters, including beyond 144 inches, for both horizontal and vertical applications. This results in further economic efficiencies (reduced inventory costs by not having to stock metal plates) for the pipe fabricator.

What is claimed is:

1. A metal pipe of single piece construction comprising:
a wall formed of a single corrugated metal sheet, the sheet having opposing first and second edges extending longitudinally along the sheet, the wall including a seam formed by abutting portions of the first and second edges, the seam extending helically about and along a length of the wall, the sheet having an interior wall side and an opposing exterior wall side, the interior wall side defining an interior wall surface of the wall, the exterior wall side defining an exterior wall surface of the wall, the sheet having a sinusoidal cross-sectional profile defining only 3 corrugation peaks at the interior wall surface and only 3 corrugation peaks at the exterior wall surface, the sheet having a flattened sheet width of approximately 27 inches and a finished sheet width of approximately 21 inches, the wall defining a pipe diameter of at least 96 inches.

2. The metal pipe of claim 1 wherein the finished sheet width is between 20¼ inches and 22⅛ inches.

3. The metal pipe of claim 1 wherein the seam is a lock seam.

4. The metal pipe of claim 1 wherein the sheet has a corrugation pitch of approximately 7 inches.

5. The metal pipe of claim 4 wherein the sheet has a corrugation pitch between 6¾ inches and 7⅜ inches.

6. The metal pipe of claim 1 wherein the sheet has a corrugation depth between adjacent corrugations of approximately 2 inches.

7. The metal pipe of claim 1 wherein the wall defines a pipe diameter between 96 inches and 288 inches.

8. The metal pipe of claim 1 wherein the wall is cylindrical shaped.

9. The metal pipe of claim 1 wherein the metal sheet has a thickness between 18 gauge and 8 gauge.

10. The metal pipe of claim 1, wherein the seam is positioned between a corrugation peak at the interior wall surface and a corrugation peak at the exterior wall surface.

11. The metal pipe of claim 1, wherein each corrugation peak resides between two adjacent sloped sections.

\* \* \* \* \*